(12) United States Patent
Klasing et al.

(10) Patent No.: US 7,686,578 B2
(45) Date of Patent: Mar. 30, 2010

(54) CONFORMAL TIP BAFFLE AIRFOIL

(75) Inventors: Kevin Samuel Klasing, Springboro, OH (US); Ching-Pang Lee, Cincinnati, OH (US); Paul Hadley Vitt, Hamilton, OH (US); Brian David Keith, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 725 days.

(21) Appl. No.: 11/507,121

(22) Filed: Aug. 21, 2006

(65) Prior Publication Data

US 2008/0044290 A1 Feb. 21, 2008

(51) Int. Cl.
*F01D 5/20* (2006.01)

(52) U.S. Cl. .................. 415/173.1; 416/228

(58) Field of Classification Search .............. 415/173.1, 415/173.4, 174.4; 416/228
See application file for complete search history.

(56) References Cited

U.S. PATENT DOCUMENTS

| | | | |
|---|---|---|---|
| 3,635,585 A | 1/1972 | Metzler | |
| 3,781,129 A | 12/1973 | Aspinwall | |
| 3,854,842 A * | 12/1974 | Caudill | 415/116 |
| 4,010,531 A | 3/1977 | Andersen et al. | |
| 4,142,824 A | 3/1979 | Andersen | |
| 4,390,320 A | 6/1983 | Eiswerth | |
| 4,424,001 A | 1/1984 | North et al. | |
| 4,606,701 A | 8/1986 | McClay et al. | |
| 4,893,987 A | 1/1990 | Lee et al. | |
| 4,940,388 A | 7/1990 | Lilleker et al. | |
| 4,992,025 A | 2/1991 | Stroud et al. | |
| 5,261,789 A | 11/1993 | Butts et al. | |
| 5,282,721 A | 2/1994 | Kildea | |
| 5,476,364 A | 12/1995 | Kildea | |
| 5,503,527 A | 4/1996 | Lee et al. | |
| 5,564,902 A | 10/1996 | Tomita | |
| 5,660,523 A | 8/1997 | Lee | |
| 5,720,431 A | 2/1998 | Sellers et al. | |
| 6,039,531 A | 3/2000 | Suenaga et al. | |
| 6,059,530 A | 5/2000 | Lee | |
| 6,086,328 A | 7/2000 | Lee | |
| 6,164,914 A | 12/2000 | Correia et al. | |
| 6,224,336 B1 | 5/2001 | Kercher | |
| 6,527,514 B2 | 3/2003 | Roeloffs | |
| 6,554,575 B2 | 4/2003 | Leeke et al. | |
| 6,595,749 B2 | 7/2003 | Lee et al. | |

(Continued)

OTHER PUBLICATIONS

Mischo, B., "Flow Physics and Profiling of Recessed Blade Tips: Impact on Performance and Heat Load," ASME GT2006-91074, May 8-11, 2006, pp: 1-11.

(Continued)

*Primary Examiner*—Edward Look
*Assistant Examiner*—Nathaniel Wiehe
(74) *Attorney, Agent, or Firm*—William S. Andes; Francis L. Conte (57) ABSTRACT

A turbine blade includes an airfoil tip with first and second tip ribs extending from a tip floor. The ribs extend along the opposite pressure and suction sides of the blade and are joined together at opposite leading and trailing edges. A tip baffle is nested transversely between the ribs, and conforms with the second rib to bifurcate the airfoil tip into first and second tip pockets extending along the corresponding pressure and suction sides.

25 Claims, 4 Drawing Sheets

U.S. PATENT DOCUMENTS 6,672,829 B1  1/2004  Cherry et al.
6,790,005 B2  9/2004  Lee et al.
6,837,687 B2 *  1/2005  Lee et al. .................... 416/224

OTHER PUBLICATIONS

U.S. Appl. No. 11/162,433, "Turbine Airfoil with Curved Squealer Tip," filed Sep. 9, 2005, M.E. Stegemiller et al.

U.S. Appl. No. 11/162,434, "Turbine Airfoil Curved Squealer Tip with Tip Shelf," filed Sep. 9, 2005, M.E. Stegemiller et al.
U.S. Appl. No. 11/507,119, filed Aug. 21, 2006, by K.S. Klasing et al.
U.S. Appl. No. 11/507,116; filed Aug. 21, 2006, by K.S. Klasing et al.
U.S. Appl. No. 11/507,120, filed Aug. 21, 2006, by K.S. Klasing et al.
U.S. Appl. No. 11/507,132, filed Aug. 21, 2006, by Ching-Pang Lee et al.

* cited by examiner

CONFORMAL TIP BAFFLE AIRFOIL

BACKGROUND OF THE INVENTION

The present invention relates generally to gas turbine engines, and, more specifically, to turbine blades therein.

In a gas turbine engine, air is pressurized in a compressor and mixed with fuel for generating combustion gases in a combustor. Various turbine stages extract energy from the combustion gases to power the engine and produce work.

A high pressure turbine (HPT) immediately follows the combustor and extracts energy from the hottest combustion gases to power the upstream compressor through one drive shaft. A low pressure turbine (LPT) follows the HPT and extracts additional energy from the combustion gases for powering another drive shaft. The LPT powers an upstream fan in a turbofan aircraft engine application, or powers an external shaft for marine and industrial applications.

Engine efficiency and specific fuel consumption (SFC) are paramount design objectives in modern gas turbine engines. The various turbine rotor blades and their corresponding nozzle vanes have precisely configured aerodynamic surfaces for controlling the velocity and pressure distributions thereover for maximizing aerodynamic efficiency.

The corresponding airfoils of the blades and vanes have generally concave pressure sides and generally convex suction sides extending axially in chord between opposite leading and trailing edges. The airfoil has a crescent profile in radial section, increasing rapidly in width from the leading edge to a maximum width region, and then decreasing in width gradually to the trailing edge.

The circumferentially or transversely opposite sides of the airfoils also extend radially in span from root to tip. The airfoils typically have thin sidewalls formed by casting of superalloy metals, with internal cooling circuits having various embodiments all specifically tailored for efficiently cooling the airfoils during operation while maximizing efficiency.

However, aerodynamic design of turbine airfoils is remarkably complex in view of the three dimensional (3D) configurations of the individual airfoils in complete rows thereof, and the correspondingly complex flow streams of the combustion gases channeled between the airfoils during operation. Adding to this complexity of design and environment are the special flow fields around the radially outer tips of the turbine blades which rotate at high speed inside a surrounding stationary shroud during operation.

The operating clearance or gap between the blade tips and the turbine shrouds should be as small as practical for minimizing leakage of the combustion gas flow therethrough while also permitting thermal expansion and contraction of the blades and shrouds without undesirable rubbing between the rotating tips and stationary shroud.

During operation, the blades in a turbine row drive the supporting rotor disk in rotation with the airfoil suction side leading the opposite airfoil pressure side. The airfoils typically twist from root to tip in the radial direction from the perimeter of the rotor disk, and the leading edges face upstream obliquely with the engine axial centerline axis to match the oblique discharge swirl angle of the cooperating nozzle vanes. The combustion gases flow generally in the axial downstream direction, with a circumferential or tangential component first engaging the airfoil leading edges in one flow direction, and then leaving the airfoils over the trailing edges thereof in a different flow direction.

The pressure and suction sides of the airfoils have correspondingly different 3D profiles for maximizing differential pressure therebetween and energy extraction from the hot combustion gases. The concave pressure side and the convex suction side effect different velocity and pressure distributions thereover which correspondingly vary between the leading and trailing edges, and from root to tip. However, the combustion gases which leak over the airfoil tips in the required tip clearance perform little, if any, useful work.

Further complicating turbine blade design is the exposed blade tips which are therefore bathed in the combustion gases which leak thereover during operation, and require suitable cooling thereof for ensuring a long useful life of the turbine blades during operation.

Modern turbine blade design typically incorporates squealer tip ribs which are small radial extensions of the pressure and suction sides of the airfoil from leading to trailing edge. The tip ribs are typically rectangular in cross section and spaced transversely or circumferentially apart to define an open tip cavity atop the airfoil which has an integral tip floor that encloses the typically hollow airfoil and the internal cooling circuit therein.

The small tip ribs provide sacrificial material in the event of a tip rub to protect the tip floor and internal cooling circuit from undesirable damage. The tip ribs increase the complexity of the combustion gas flow field introducing local secondary fields which affect turbine efficiency, flow leakage, and tip cooling.

The primary flow direction of the combustion gases is in the axially downstream direction in the flow passages defined between adjacent blades. The axial flow stream also varies along the radial direction from root to tip of each airfoil. And, these axial and radial flow variations are further compounded over the airfoil tip where the combustion gases leak between the pressure and suction sides of each airfoil.

Accordingly, the prior art is replete with various configurations of turbine blade tips addressing different problems and performance considerations including turbine efficiency, tip leakage, and tip cooling. These three important considerations are interdependent at least in part, but the complex 3D flow fields over the different pressure and suction sides at the airfoil tip and between the leading and trailing edges renders quite complex the evaluation thereof.

However, modern computational fluid dynamics (CFD) includes powerful software that improves the ability to mathematically analyze complex 3D flow streams in gas turbine engines and provides a mechanism from which further improvements in turbine blade design may be realized.

For example, it is desired to improve turbine blade tip design by reducing tip flow leakage, or increasing turbine efficiency, or improving tip cooling, or any combination of these factors either separately or together.

BRIEF DESCRIPTION OF THE INVENTION

A turbine blade includes an airfoil tip with first and second tip ribs extending from a tip floor. The ribs extend along the opposite pressure and suction sides of the blade and are joined together at opposite leading and trailing edges. A tip baffle is nested transversely between the ribs, and conforms with the second rib to bifurcate the airfoil tip into first and second tip pockets extending along the corresponding pressure and suction sides.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DETAILED DESCRIPTION OF THE INVENTION

Figure 1:
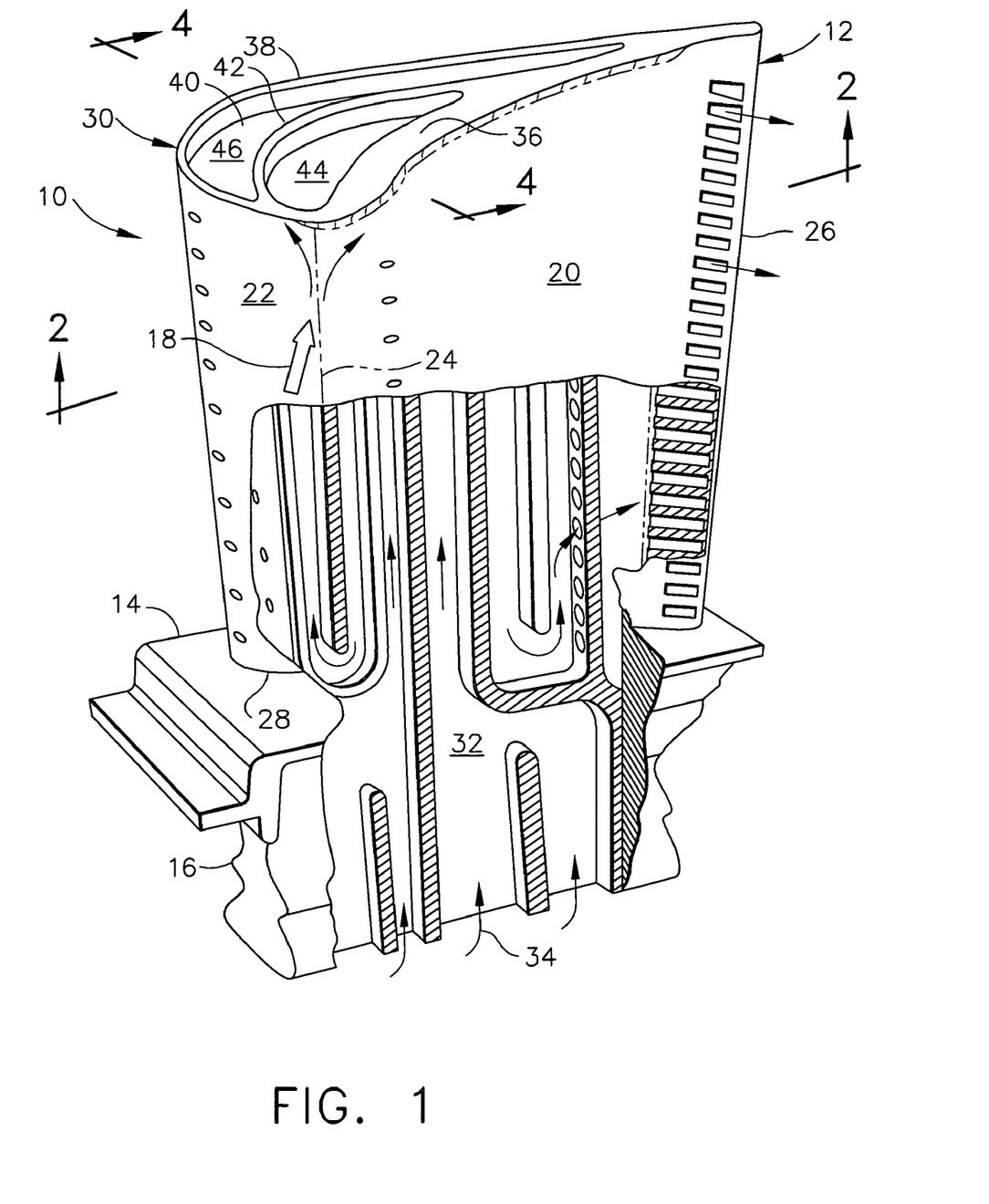
FIG. 1 is a partly sectional isometric view of an exemplary first stage turbine rotor blade.

FIG. 1 illustrates an exemplary first stage turbine rotor blade 10 for use in the HPT of a gas turbine engine. The blade is typically cast from superalloy metal with an airfoil 12, platform 14 at the root thereof, and a supporting dovetail 16 in an integral, one-piece assembly.

The dovetail 16 may have any conventional form, such as the axial-entry dovetail illustrated in FIG. 1, which mounts the blade in a corresponding dovetail slot in the perimeter of a supporting rotor disk (not shown). The disk holds a full row of the blades spaced circumferentially apart from each other to define inter-blade flow passages therebetween.

During operation, combustion gases 18 are generated in the combustor of the engine (not shown) and suitably channeled downstream over the corresponding turbine blades 10 which extract energy therefrom for powering the supporting rotor disk. The individual platform 14 provides a radially inner boundary for the combustion gases and adjoins adjacent platforms in the full row of turbine blades.

Figure 2:
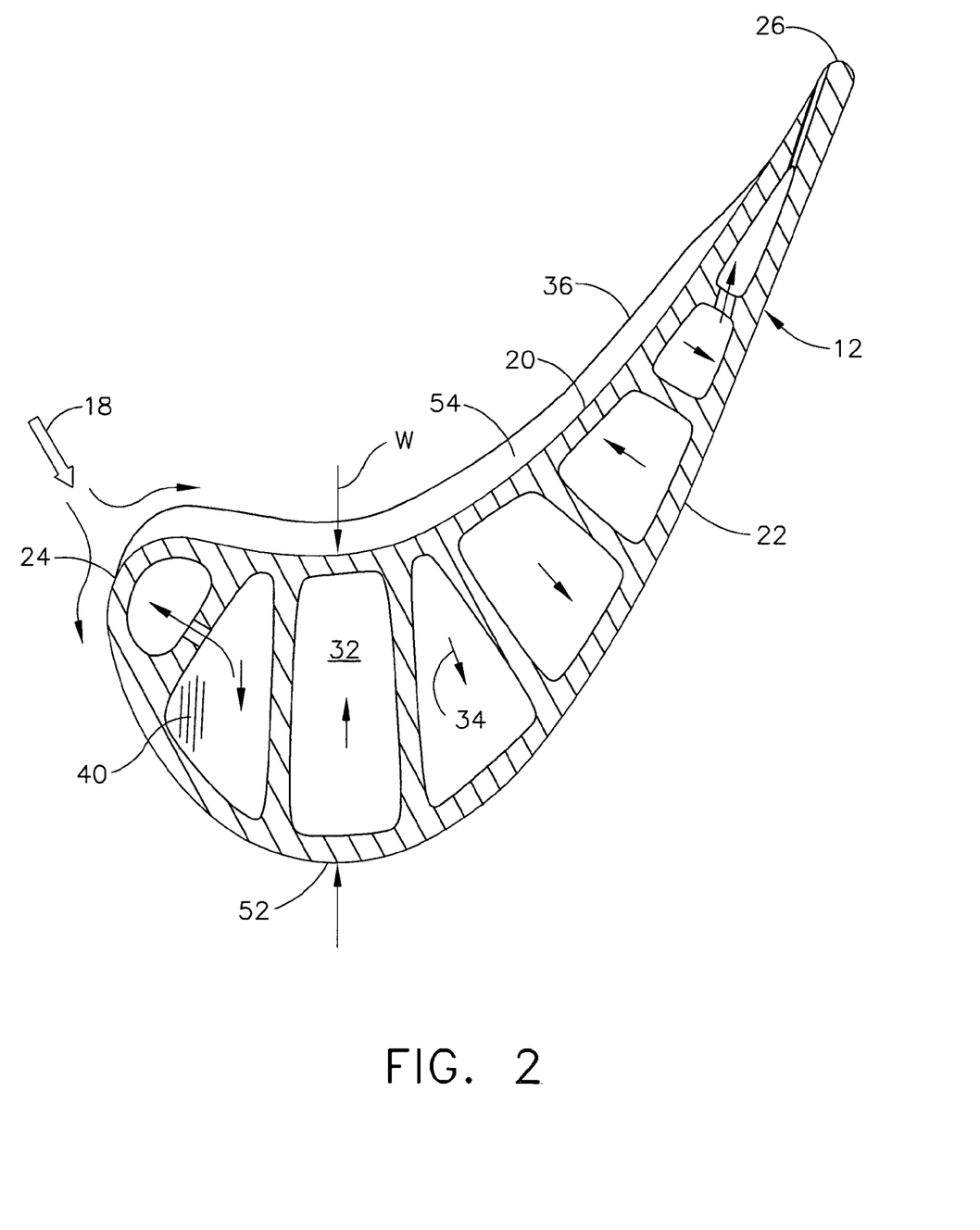
FIG. 2 is a radial sectional view through the airfoil illustrated in FIG. 1 and taken along line 2-2.

The airfoil 12 illustrated in FIGS. 1 and 2 includes circumferentially or transversely opposite pressure and suction sides 20,22 extending axially in chord between opposite leading and trailing edges 24,26 and extends radially in span from the airfoil root 28 to terminate in a radially outer tip cap, or tip, 30. The airfoil pressure side 20 is generally concave between the leading and trailing edges and complements the generally convex airfoil suction side 22 between the leading and trailing edges.

The external surfaces of the pressure and suction sides 20,22 of the airfoil have the typical crescent shape or profile conventionally configured for effecting corresponding velocity and pressure distributions of the combustion gases thereover during operation for maximizing energy extraction from the gases.

FIG. 2 illustrates an exemplary radial cross section of the airfoil and the typical crescent profile thereof which varies suitably from root to tip of the airfoil as required for extracting energy from the combustion gases. Common to the various radial cross sections is the airfoil increasing rapidly in transverse width W aft from the leading edge 24 to the hump location of maximum width just before the midchord of the airfoil, with the airfoil then decreasing gradually in width to the narrow or thin trailing edge 26.

The airfoil 12 is typically hollow and includes an internal cooling circuit 32 which may have any conventional configuration, such as the illustrated two three-pass serpentine circuits that terminate in corresponding flow passages behind the leading edge and in front of the trailing edge. The cooling circuit extends through the platform and dovetail with corresponding inlets in the base of the dovetail for receiving pressurized cooling air 34 from the compressor of the engine (not shown) in any conventional manner.

In this way, the blade is internally cooled from root to tip and between the leading and trailing edges by the internal cooling air which then may be discharged through the thin airfoil sidewalls in various rows of film cooling holes of conventional size and configuration.

Since the leading edge of the airfoil is typically subject to the hottest incoming combustion gases, dedicated cooling thereof is provided in any suitable manner. And, the thin trailing edge region of the airfoil typically includes a row of pressure side trailing edge cooling slots for discharging a portion of the spent cooling air.

As described above, the turbine airfoil 12 shown initially in FIG. 1 has a precisely configured 3D external profile which correspondingly affects the velocity and pressure distributions of the combustion gases 18 as they flow in the axial downstream direction from leading to trailing edges 24,26. The blades are attached to the perimeter of the supporting disk and rotate during operation, which generates secondary flow fields in the combustion gases with typically radially outwardly migration of the combustion gases along the span of the airfoil.

Furthermore, the relative pressure of the combustion gases on the pressure side 20 of the airfoil is higher than the pressure along the suction side of the airfoil, and along with the corresponding rotation of the blade during operation introduces further secondary or tertiary affects in the combustion gas flow field as it flows radially up and over the exposed airfoil tip 30 during operation.

The turbine rotor blade described above may be conventional in configuration and operation for use in a gas turbine engine, including for example the first stage of the HPT. The conventional blade may then be modified as described hereinbelow at the airfoil tip 30 to include first and second squealer tip ribs 36,38 which are radially integral extensions of the airfoil pressure and suction sides, or sidewalls, 20,22, respectively, and conform in profile or curvature therewith.

The first or pressure side rib 36 conforms chordally with the shape or profile of the concave pressure side 20 of the airfoil, and correspondingly, the second or suction side rib 38 conforms in chordal profile with the convex suction side 22 of the airfoil. The two ribs 36,38 are integrally joined together at the airfoil leading edge 24 and at the relatively thin airfoil trailing edge 26.

The two ribs 36,38 extend radially outwardly in span or elevation from a common tip floor 40 at equal heights and provide a full perimeter boundary around the airfoil tip, with the ribs conforming in aerodynamic profile with the corresponding pressure and suction sides of the airfoil. The tip floor 40 is typically solid, but may have small cooling holes or dust holes (not shown) for discharging some of the spent air from the internal cooling circuit in any conventional manner.

Figure 3:
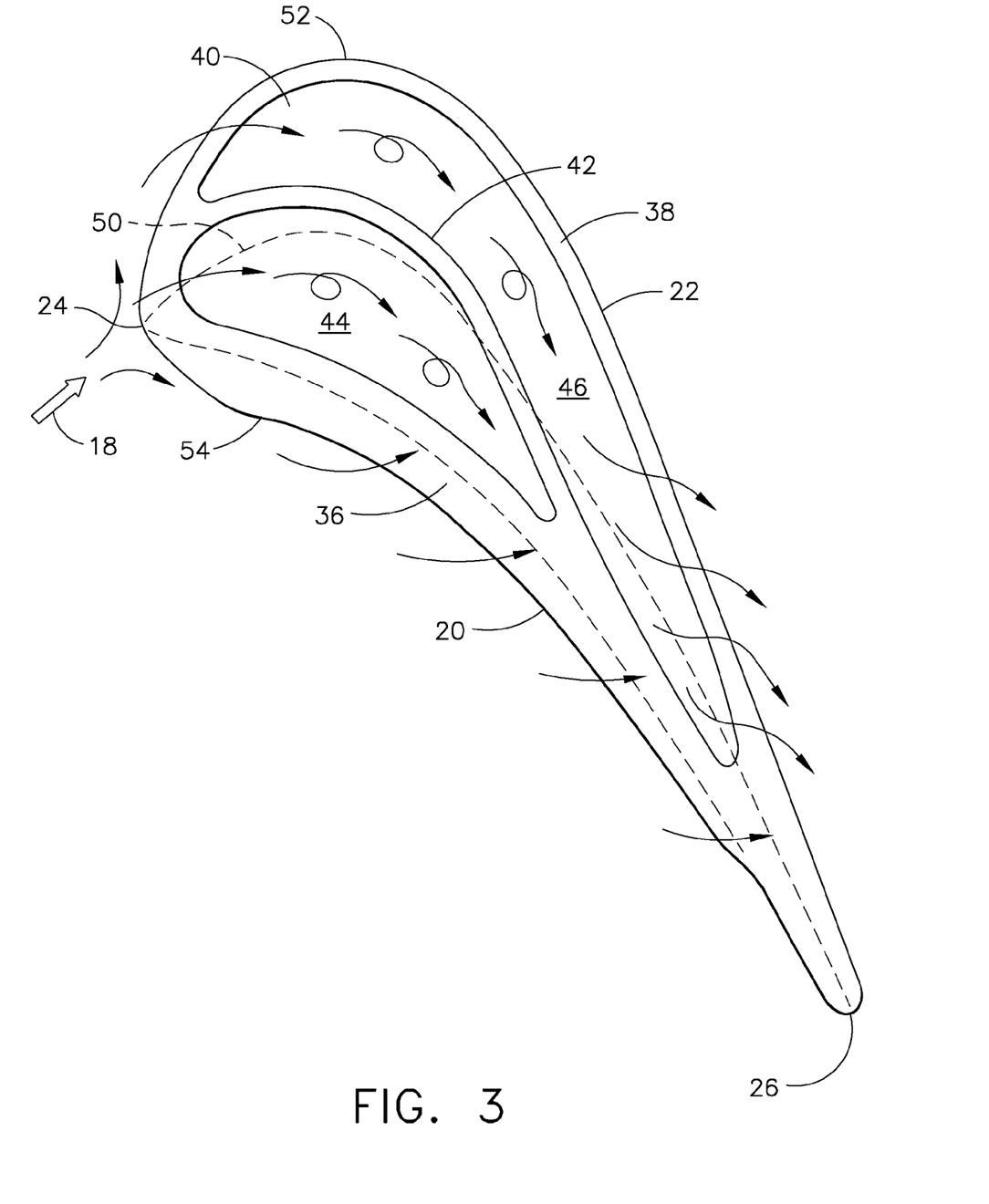
FIG. 3 is a top view of the airfoil tip illustrated in FIG. 1.

As shown in FIGS. 1 and 3, the airfoil tip further includes an arcuate or convex tip baffle or rib 42 extending chordally aft between the opposite leading and trailing edges 24,26. The tip baffle 42 is nested circumferentially or transversely between the two ribs 36,38 to conform in aerodynamic profile with the convex second rib 38 which bounds the convex suction side of the airfoil. The nested baffle bifurcates the airfoil tip 30 into first and second tip cavities or pockets 44,46 on opposite sides of the separating baffle, which pockets are externally bounded by the corresponding ribs 36,38.

As described above, the two ribs 36,38 provide short radial extensions of the corresponding pressure and suction sidewalls of the airfoil and introduce the recessed tip pockets for improving performance and longevity of the turbine blade. The small ribs may accommodate occasional tip rubbing in the turbine and protect the internal cooling circuit 32 therefrom. However, the tip pockets also provide local regions over which the combustion gases flow during operation as they leak over the tip between the pressure and suction sides of the blade.

The tip baffle 42 is chordally shorter than the second tip rib 38 but shares its aerodynamic, convex profile for improving blade performance. The convex chordal profile of the baffle 42 conforms with the convex chordal profile of the second rib 38 and is suitably shorter so that the second tip pocket 46 extends aft of the first tip pocket 44 along the pressure side first rib 36 in the relatively thin, converging aft portion of the airfoil.

Figure 4:
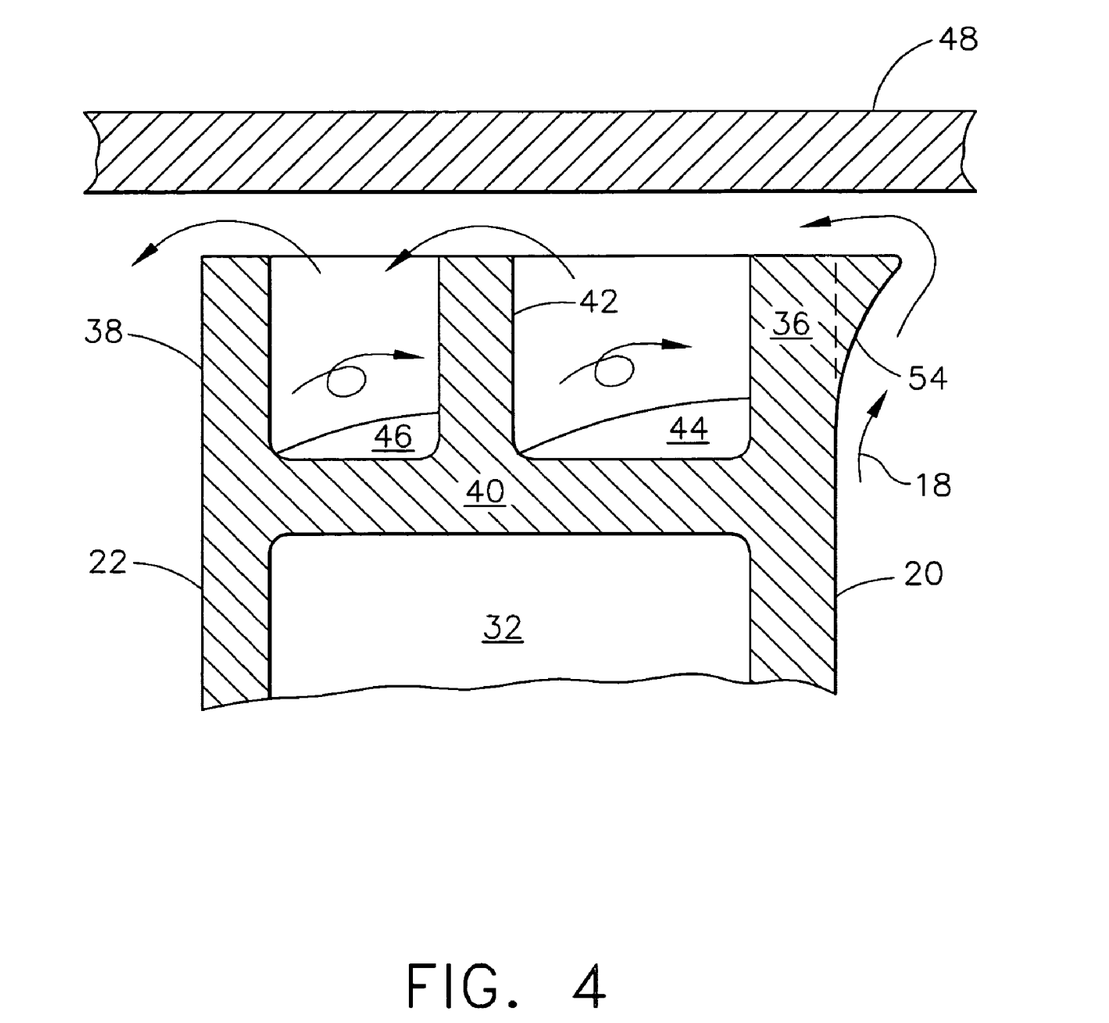
FIG. 4 is a transverse radial sectional view through the airfoil tip illustrated in FIG. 1 and taken along line 4-4, in conjunction with a surrounding turbine shroud.

FIG. 4 illustrates in radial sectional view the conformal tip baffle 42 between the bounding pressure and suction side ribs 36,38 suitably mounted inside a conventional turbine shroud 48, shown in relevant part. The airfoil tip is preferably manufactured in a common and unitary casting of parts from a conventional superalloy metal.

The two ribs 36,38 and conforming tip baffle 42 cooperate in a unitary assembly with a common elevation or span from the tip floor 40 to effect a coplanar radially outer tip surface that defines a relatively small clearance or gap with the inner surface of the surrounding turbine shroud 48. In this way, leakage of the combustion gases 18 over the airfoil tip and through the blade-shroud gap may be minimized during operation.

The airfoil, including its tip, as illustrated in FIG. 3 has the typical crescent aerodynamic profile between the opposite leading and trailing edges, and including the conventional arcuate camber line 50 which represents the mean or midplane line between the opposite pressure and suction sides. The pressure side 20 is concave, and the first tip rib 36 is the radial extension thereof conforming in concave profile therewith. The opposite suction side 22 is convex, and the second rib 38 extends radially outwardly therefrom to smoothly conform therewith.

Correspondingly, the tip baffle 42 is introduced between the opposite tip ribs 36,38 to generally follow the arcuate camber line 50 of the airfoil so that the tip baffle itself is convex in chordal profile and conforms in convex profile with the corresponding convex profile of the second rib 38.

As initially shown in FIG. 2, the airfoil 12 increases or diverges in transverse width W aft from the leading edge 24 to a hump 52 having maximum transverse width for the specific radial section. The airfoil 12 then decreases or converges in width aft from the hump 52 toward the trailing edge 26. The resulting aerodynamic profile of the airfoil includes relatively large convex curvature in the forward portion or half of the airfoil, and relatively little curvature in the converging aft portion or half of the airfoil which becomes relatively thin at the trailing edge.

As shown in FIG. 3, the convex tip baffle 42 is preferably spaced near the transverse middle of the airfoil tip between the opposite first and second ribs 36,38 at the hump 52 of the airfoil tip to generally follow this portion of the camber line 50. In this configuration, the convex baffle 42 conforms more with the convex second rib 38 than with the opposite first rib 36 in the general hump region of the airfoil tip.

Since the first rib 36 illustrated in FIG. 3 follows the concave profile of the airfoil pressure side 20, its outer face or surface is similarly concave, but its inner face or surface is correspondingly convex where it bounds the first pocket 44.

Correspondingly, the second rib 38 follows the convex profile of the suction side 22, with the outer surface or face of the second rib 38 being coplanar therewith and equally convex, while the inner surface or face of the second rib 38 is correspondingly concave where it bounds the second tip pocket 46.

The tip baffle 42 follows the convex contour of the second rib 38 and therefore has a convex outer surface facing the second rib 38, and a correspondingly concave inner surface facing the opposite first rib 36.

The second rib 38 and tip baffle 42 illustrated in FIG. 4 have generally rectangular radial sections and may share common thicknesses of about 25-35 mils (0.6-0.9 mm), with a common height of about 40 mils (1.0 mm).

The first rib 36 illustrated in FIG. 4 may have a substantial rectangular cross section, shown in part in dashed line, but in the exemplary embodiment illustrated in FIG. 4 further includes an arcuate flare 54 which may be used to enhance aerodynamic performance in accordance with an independent development feature of the turbine blade. The flare 54 provides a smooth arcuate fillet between the pressure side 20 and the radially outer surface of the first rib 36, and correspondingly increases the thickness of the first rib 36 thereat.

Since the tip baffle 42 is preferably shorter in longitudinal length than both ribs 36,38, it preferably commences integrally with the second rib 38 between the leading edge 24 and hump 52 as illustrated in FIG. 3, and preferably near the leading edge 24.

Correspondingly, the baffle 42 preferably terminates integrally with the opposite first rib 36 chordally between the hump 52 and trailing edge 26, and forward of the aft end of the second rib 38, which permits the converging second pocket 46 to extend aft from the tip baffle and first pocket 44. The two ribs and baffle are continuous in their longitudinal profiles, and the second pocket 46 is bounded by both ribs 36,38 in the aft extension thereof beyond the first tip pocket 44.

By terminating the first pocket 44 at a substantial distance upstream from the converging trailing edge region of the airfoil, the second pocket 46 may maintain adequate width for channeling the combustion tip gases therethrough, without being excessively narrow which could adversely affect airfoil performance.

To maximize the conformance of the convex tip baffle 42 with the convex second rib 38 illustrated in FIG. 3, the forward end of the tip baffle preferably joins the forward end of the second rib 38 closer to the leading edge 24 than to the downstream hump 52 at the airfoil tip.

Nevertheless, the forward end of the tip baffle 42 is preferably spaced slightly from the leading edge 24 so that the first pocket 44 is transversely wider in width than corresponding portions of the second pocket 46. The baffle 42 extends aft from the leading edge region of the airfoil, and both tip pockets 44,46 correspondingly extend aft and have initially diverging widths conforming with the respective profiles of the two ribs 36,38 and the baffle 42 disposed therebetween.

The convex curvature of the baffle 42 ensures that the forward end of the baffle blends tangentially with the second rib 38 at an acute included angle bounding the forward portion of the second pocket 46.

Correspondingly, the aft end of the tip baffle 42 preferably blends tangentially with the first rib 36 at a shallow included angle therewith and bounds the aft end of the first pocket 44. The juncture of the aft end of the baffle 42 with the first rib 36 bounds the aft end of the second pocket 46 downstream or aft from the aft end of the first pocket.

The transverse width of the second pocket 46 may be maximized in the thin trailing edge region of the airfoil by joining the aft end of the baffle 42 closer to the hump 52 of the airfoil tip than to the trailing edge 26.

The maximum width hump region of the airfoil typically occurs within the first 50 percent of the airfoil chord length, with the hump maximizing differential pressure across the airfoil for extracting energy from the combustion gases during operation. The tip baffle 42 preferably terminates closer to the hump than to the trailing edge within the general region of up to about 75 percent of the chord length from the leading edge.

At the hump section of the airfoil tip illustrated in FIG. 3, the convex baffle 42 is spaced near the transverse middle of the airfoil where the camber line extends, with the tip baffle preferably being spaced closer to the second rib 38 than to the first rib 36 so that the second pocket 46 is slightly narrower than the first pocket 44 at this chordal section, as additionally illustrated in FIG. 4.

As shown in FIG. 3, the two pockets 44,46 initially diverge in width between the leading edge and hump, while converging in transverse width aft between the hump 52 and the trailing edge 26.

Also at the hump 52 in the airfoil tip, the tip baffle 42 and the second rib 38 similarly have substantially maximum convex curvature and camber to maximize airfoil efficiency. The tip baffle 42 is selectively introduced into the airfoil tip along the camber line in the hump region of maximum convex curvature for maximizing its effect in improving aerodynamic performance.

As indicated above, CFD analysis may be used to evaluate aerodynamic performance of the turbine blade, as well as determine variations in configuration of the conformal tip baffle 42 and its effect on blade performance.

Comparison CFD analyses have been conducted for the exemplary tip design illustrated in FIGS. 1-4, both with the pressure side flare 54 and without. Without the flare 54, in which the first rib 36 has a plain rectangular cross section, the tip baffle 42 is predicted to improve turbine efficiency by a significant amount over a baseline or reference airfoil tip without the tip baffle. Correspondingly, the tip baffle 42 is also predicted to reduce leakage of the combustion gases over the airfoil tip by a significant amount.

The introduction of the pressure side flare 54 provides an independent improvement to the introduction of the tip baffle 42. The CFD analysis predicts a further increase in turbine efficiency by incorporating the flare, with a magnitude being almost double the efficiency improvement attributable to the tip baffle itself. Correspondingly, tip leakage is predicted to be reduced more than double with the introduction of the flare 54 along with the tip baffle 42.

FIG. 3 illustrates exemplary streamlines of the combustion gases 18 as they flow downstream over the airfoil tip during operation. Since the tip baffle 42 circumferentially partitions the airfoil tip it creates the adjoining two pockets 44,46 extending aft along the opposite sides of the airfoil.

The incoming flow streamlines are spread laterally around the leading edge 24 and leak in the axial downstream direction over the forward portion of the second rib 38 into both tip pockets 44,46. The dividing tip baffle 42 introduces an additional flow restriction for the tip flow, as well as guides that flow downstream through the two recessed pockets 44,46.

Secondary flow vortices are developed in the flow streamlines within the two pockets and flow aft as the pockets converge. The portion of the tip leakage captured by the first pocket 44 is discharged over the aft end of the tip baffle 42 into the aft end of the second pocket 46 from which the collective gases leak transversely over the second rib 38 toward the trailing edge.

Additional gases leak transversely over the aft end of the first rib 36 and over the aft end of the second pocket 46 for discharge over the second rib 38.

The axial and circumferential components of the flow leakage between the pressure and suction sides of the airfoil are thusly affected by the introduction of the conformal tip baffle 42 and cooperating two pockets 44,46. The convex tip baffle 42 provides an additional convex surface from which energy may extracted from the leakage flow, while also reducing the amount of that leakage flow itself.

Although it is possible to introduce a second convex tip baffle to partition to the airfoil tip into three recessed tip pockets, the performance thereof would appear to be detrimental. The airfoil tip is relatively narrow especially in the converging aft portion thereof. If the transverse width of any one of the tip pockets becomes too small or narrow, such a narrow pocket will lose its ability to capture tip flow and guide vortices therein.

An overly narrow tip pocket will simply permit tip leakage to flow over the pocket in the manner of an otherwise solid airfoil tip, which would both decrease turbine efficiency and increase tip leakage.

Since the tip baffle 42 is selectively introduced into the high camber region of the airfoil, the transverse width of the suction side pocket 46 may remain relatively wide over its full chordal extent terminating upstream from the trailing edge where the airfoil becomes relatively thin.

Correspondingly, the transverse width of the pressure side pocket 44 may be substantially larger as the convex baffle 42 divides the airfoil tip into two relatively wide portions.

And, the minimum transverse width of each of the two pockets may be about 40 mils (1.0 mm) to ensure improved tip performance.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims in which we claim:

1. A turbine blade comprising:
    an airfoil, platform, and integral dovetail;
    said airfoil including a concave pressure side and transversely opposite, convex suction side extending chordally between opposite leading and trailing edges and extending in span from root to tip;
    said airfoil tip including transversely opposite first and second ribs extending outwardly from a common tip floor, and integrally joined together at said leading and trailing edges to conform with said pressure and suction sides, respectively; and
    a tip baffle extending chordally aft between said leading and trailing edges and nested transversely between said first and second ribs in a unitary metal casting therewith to bifurcate said airfoil tip into first and second tip pockets bounded by said first and second ribs, respectively, with said baffle being convex toward and conforming with said second rib, and said second pocket extending aft of said first pocket along said first rib.

2. A turbine blade comprising:
    an airfoil, platform, and integral dovetail;
    said airfoil including a concave pressure side and transversely opposite, convex suction side extending chordally between opposite leading and trailing edges and extending in span from root to tip;

said airfoil increases in width aft from said leading edge to a hump having maximum width, and decreases in width aft therefrom to said trailing edge;

said airfoil tip including transversely opposite first and second ribs extending outwardly from a common tip floor, and integrally joined together at said leading and trailing edges to conform with said pressure and suction sides, respectively;

a tip baffle extending chordally aft between said leading and trailing edges and nested transversely between said first and second ribs in a unitary metal casting therewith to bifurcate said airfoil tip into first and second tip pockets bounded by said ribs, with said baffle being convex toward said second rib, and said second pocket extending aft of said first pocket along said first rib; and said tip baffle is spaced between said first and second ribs to conform more with said second rib than said first rib in the hump region of said airfoil tip.

3. A blade according to claim 2 wherein said tip baffle commences integrally with said second rib between said leading edge and hump, and terminates integrally with said first rib between said hump and trailing edge in coplanar elevation above said tip floor, and said second pocket is bounded by both said first and second ribs aft of said first pocket.

4. A blade according to claim 3 wherein said tip baffle joins said second rib closer to said leading edge than to said hump.

5. A blade according to claim 4 wherein said tip baffle joins said first rib closer to said hump than to said trailing edge.

6. A blade according to claim 5 wherein said tip baffle is spaced closer to said second rib than to said first rib at said hump.

7. A blade according to claim 5 wherein both said first and second tip pockets converge aft in transverse width between said hump and said trailing edge.

8. A blade according to claim 5 wherein said tip baffle is concave toward said first rib and convex toward said second rib, and has a substantially constant thickness.

9. A blade according to claim 5 wherein both said tip baffle and second rib have maximum convex curvature near said hump.

10. A blade according to claim 5 wherein said tip baffle blends tangentially with said second rib at an acute included angle therewith, and blends tangentially with said first rib and bounds said second pocket aft therefrom.

11. A turbine blade comprising a unitary cast metal airfoil tip having a pressure-side first rib and a transversely opposite suction-side second rib extending outwardly from a tip floor and integrally joined together at chordally opposite leading and trailing edges, and a nested tip baffle conforming with said second rib and spaced transversely therefrom to bifurcate said airfoil tip into a first tip pocket along said first rib, and a second tip pocket along said second rib and extending aft of said first pocket along said first rib.

12. A blade according to claim 11 further comprising an airfoil having a concave pressure side with said first rib conforming in concave profile therewith, and a convex suction side with said second rib conforming in convex profile therewith, and said tip baffle is convex toward said second rib.

13. A blade according to claim 12 wherein:

said airfoil increases in width aft from said leading edge to a hump having maximum width and decreases in width aft therefrom toward said trailing edge; and said tip baffle is spaced between said first and second ribs to conform more with said second rib than said first rib in the hump region of said airfoil tip.

14. A blade according to claim 13 wherein said tip baffle commences near said leading edge and terminates between said hump and trailing edge, with said second pocket extending aft therefrom.

15. A blade according to claim 14 wherein said tip baffle integrally joins said second rib near said leading edge, and integrally joins said first rib forward of the aft end of said second pocket, and is coplanar with said first and second ribs in elevation above said tip floor.

16. A blade according to claim 14 wherein said tip baffle joins said second rib closer to said leading edge than to said hump.

17. A blade according to claim 14 wherein said tip baffle joins said second rib spaced from said leading edge, and said first pocket is wider than said second pocket.

18. A blade according to claim 14 wherein said tip baffle blends tangentially with said second rib at an acute included angle therewith.

19. A blade according to claim 14 wherein said tip baffle joins said first rib closer to said hump than to said trailing edge.

20. A blade according to claim 14 wherein said tip baffle blends tangentially with said first rib and bounds said second pocket aft therefrom.

21. A blade according to claim 14 wherein said tip baffle is spaced near the middle between said first and second ribs at said hump.

22. A turbine blade comprising an airfoil tip having a pressure-side first rib and a transversely opposite suction-side second rib extending outwardly from a tip floor and integrally joined together at chordally opposite leading and trailing edges, and a nested tip baffle conforming with said second rib and spaced transversely therefrom to bifurcate said airfoil tip into a first tip pocket along said first rib, and a second tip pocket along said second rib and extending aft of said first pocket along said first rib, and said tip baffle is spaced closer to said second rib than to said first rib at the maximum width of said airfoil tip.

23. A blade according to claim 14 wherein both said first and second tip pockets converge aft in transverse width between said hump and said trailing edge.

24. A blade according to claim 14 wherein said tip baffle is concave toward said first rib and convex toward said second rib, and has a substantially constant thickness.

25. A blade according to claim 14 wherein both said tip baffle and second rib have maximum convex curvature near said hump.

* * * * *